United States Patent
Chien

(10) Patent No.: US 10,623,568 B2
(45) Date of Patent: Apr. 14, 2020

(54) PRE-PROCESSING FOR COMMUNICATION SERVICES

(71) Applicant: AT&T Mobility II LLC, Atlanta, GA (US)

(72) Inventor: Ginger Chien, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 581 days.

(21) Appl. No.: 13/706,962

(22) Filed: Dec. 6, 2012

(65) Prior Publication Data
US 2014/0162609 A1    Jun. 12, 2014

(51) Int. Cl.
*H04M 3/51* (2006.01)
*H04L 29/08* (2006.01)

(52) U.S. Cl.
CPC ...... *H04M 3/5166* (2013.01); *H04L 67/2804* (2013.01); *H04M 2203/2038* (2013.01); *H04M 2250/12* (2013.01)

(58) Field of Classification Search
CPC .............................. H04W 4/02; H04W 64/00
USPC .............. 455/404.2, 414.3, 415, 456.3
See application file for complete search history.

(56) References Cited

U.S. PATENT DOCUMENTS

| | | | |
|---|---|---|---|
| 6,198,914 B1 * | 3/2001 | Saegusa | 455/404.2 |
| 8,036,630 B2 * | 10/2011 | Park et al. | 455/404.1 |
| 8,155,280 B1 | 4/2012 | Or-Bach et al. | |
| 8,300,798 B1 | 10/2012 | Wu et al. | |
| 2001/0051787 A1 * | 12/2001 | Haller | A61B 5/0031 604/66 |
| 2004/0093154 A1 * | 5/2004 | Simonds et al. | 701/200 |
| 2008/0063169 A1 * | 3/2008 | Wang | H04L 65/4061 379/201.01 |
| 2012/0052834 A1 * | 3/2012 | Riggs et al. | 455/404.2 |
| 2013/0013331 A1 * | 1/2013 | Horseman | 705/2 |

OTHER PUBLICATIONS

A screenshot downloaded from the internet on Feb. 22, 2013 from fonolo.com/why-fonolo/ (5 pages).
U.S. Appl. No. 13/307,839 to Stine et al., filed Nov. 30, 2011.

* cited by examiner

*Primary Examiner* — Natasha W Cosme
(74) *Attorney, Agent, or Firm* — Greenblum & Bernstein, P.L.C.

(57) ABSTRACT

A method for providing a communication service includes detecting an initiated communication initiated by a communications device with a processor and a memory. Environmental data for an environment of the communications device is identified based on detecting the initiated communication. The environmental data is used to supplement a communication service requested by the initiated communication.

20 Claims, 10 Drawing Sheets

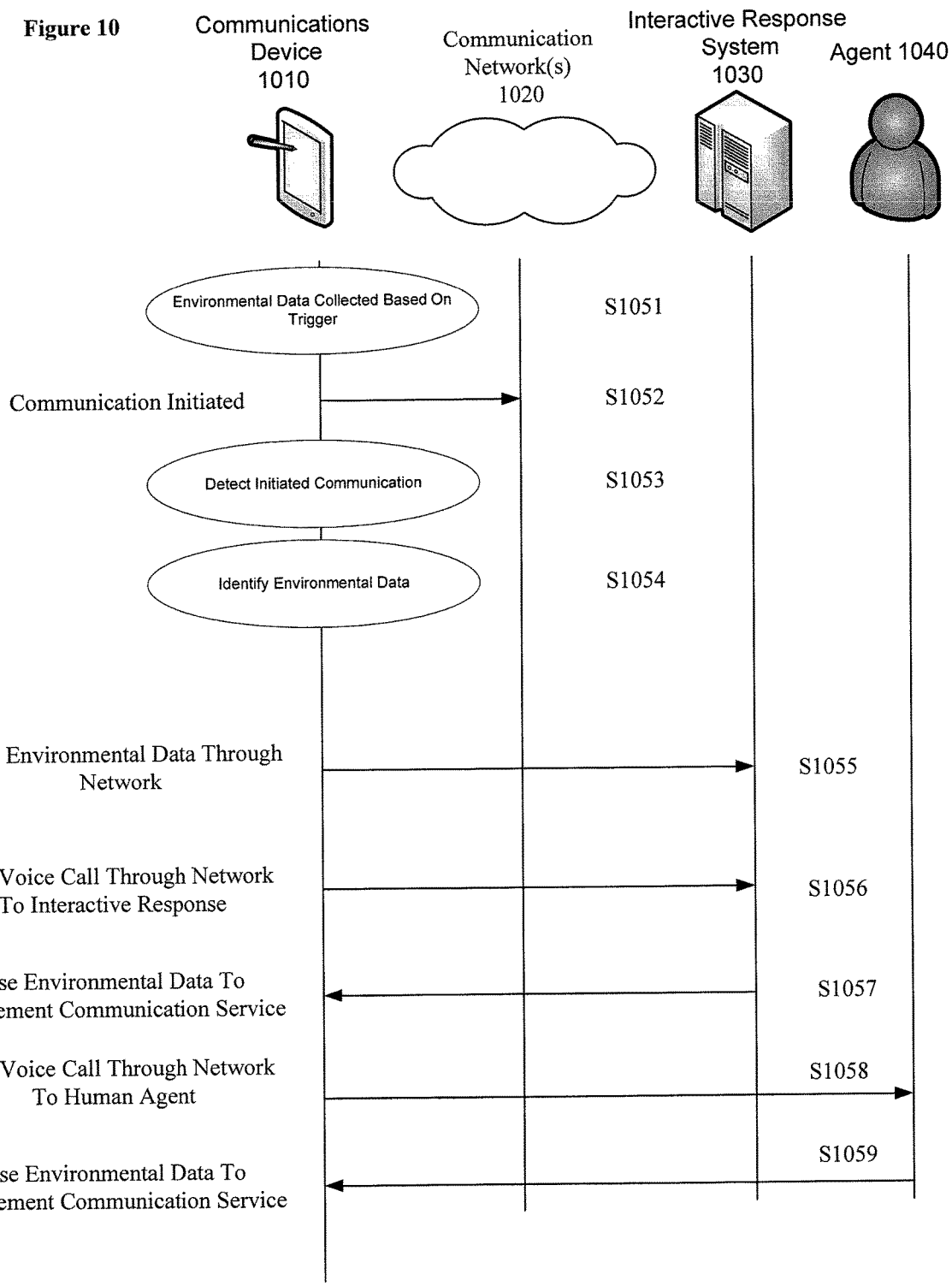

PRE-PROCESSING FOR COMMUNICATION SERVICES

BACKGROUND

1. Field of the Disclosure

The present disclosure relates to communication services. More particularly, the present disclosure relates to pre-processing environmental context information for a communication before an interactive agent for a communication service begins providing the communication service in the communication.

2. Background Information

When a communication is initiated to request a communication service, time is spent initiating and processing the communication in order to arrange an interactive agent to provide the communication service. For example, a telephone call begins with a dialed number being input or selected, followed by the dialed number being interpreted in the network to identify a destination, the communication being routed to the identified destination, and then the destination being contacted to arrange an agent to provide the communication service. Alternatively, an internet request begins with an internet address being input or selected, followed by the internet address being interpreted to identify an internet destination, the internet request being routed to the identified internet destination, and then the internet destination being contacted to retrieve an interactive webpage from a host that hosts the webpage to provide the communication service. Even following the initial contact with the dialed number or webpage, an interaction with an interactive agent may be delayed based on, e.g., activity volume, or while awaiting a requester of the communication service to input requested information as part of pre-processing before the communication service is provided by an agent.

BRIEF DESCRIPTION OF THE DRAWINGS

FIG. 10 shows another flow diagram for pre-processing for communication services, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Environmental data as described herein is context information for the environment around a communications device that initiates a communication. The environmental data specifically defines, is specifically characteristic of, or is uniquely and specifically obtained in an area that is the environment from which a communication is originated. The environmental data can include characteristics of the requester or other individuals in the area, characteristics of the nature of the area, environmental characteristics of the area such as temperature, records of activity in the environment, or any other data specific to an area and that may help explain the context of why a specific communication request is being initiated by the requester from the area.

When a requester wants to request a communication service, the requester enters a communications address, or searches for a communications address and selects a communications address returned from the search. A communication is then initiated. During the time from when the requester starts to initiate the communication, the communication is initiated and the initiated communications is detected, and environmental data for the communication is identified based on detecting the initiation of the initiated communication. The environmental data is used to supplement a communication service requested by the initiated communication.

A smart phone or other communications device is used to initiate the communication. The smart phone or other communications device has a memory that stores data and executable instructions, and a processor that processes the data and executable instructions. The communications device may also store and execute executable instructions that monitor the communications device to detect when a communication is initiated, such as by detecting when a communications address is being entered or selected, or by detecting when the communications address is being initially processed to initiate the communication.

Figure 1:
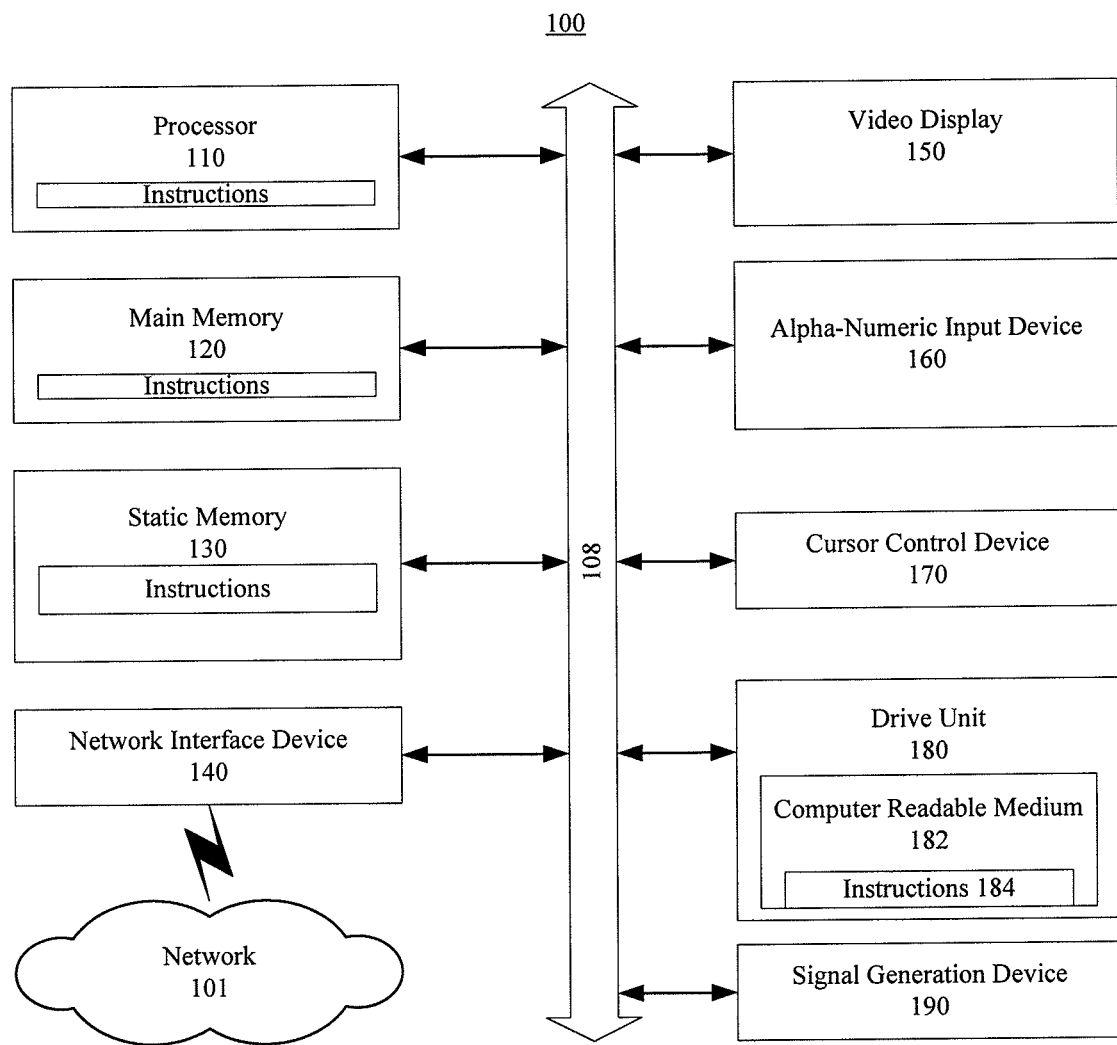
FIG. 1 shows an exemplary general computer system that includes a set of instructions for pre-processing for communication services, according to an aspect of the present disclosure.

FIG. 1 is an illustrative embodiment of a general computer system, on which a method of pre-processing for communication services can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server computer or as a client user computer in a server-client user network environment, or as a peer computer system in a peer-to-peer (or distributed) network environment. The computer system 100 can also be implemented as or incorporated into various devices, such as a personal computer (PC), a desktop computer, a laptop computer, a server computer, a client computer, a peer computer, a tablet personal computer (PC), a personal digital assistant (PDA), a mobile device, a global positioning satellite (GPS) device, a palmtop computer, a communications device, a wireless telephone, a control system, a personal trusted device, a web appliance, an interactive system computer, an interactive response system, a user computer, a user device, a user smart phone, an agent computer, an agent IP phone, a monitor, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions as described herein.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120, the static memory 130, and the processor 110 also may be or may include computer-readable media that are tangible and non-transitory during the time instructions 184 are stored therein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. The software programs include executable instructions executed by processors as described herein. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140. The computer-readable medium 182 or any other computer-readable medium contemplated herein may be a tangible machine or article of manufacture that is tangible and non-transitory for a period of time during which instructions and/or data are stored therein or thereon.

Figure 2:
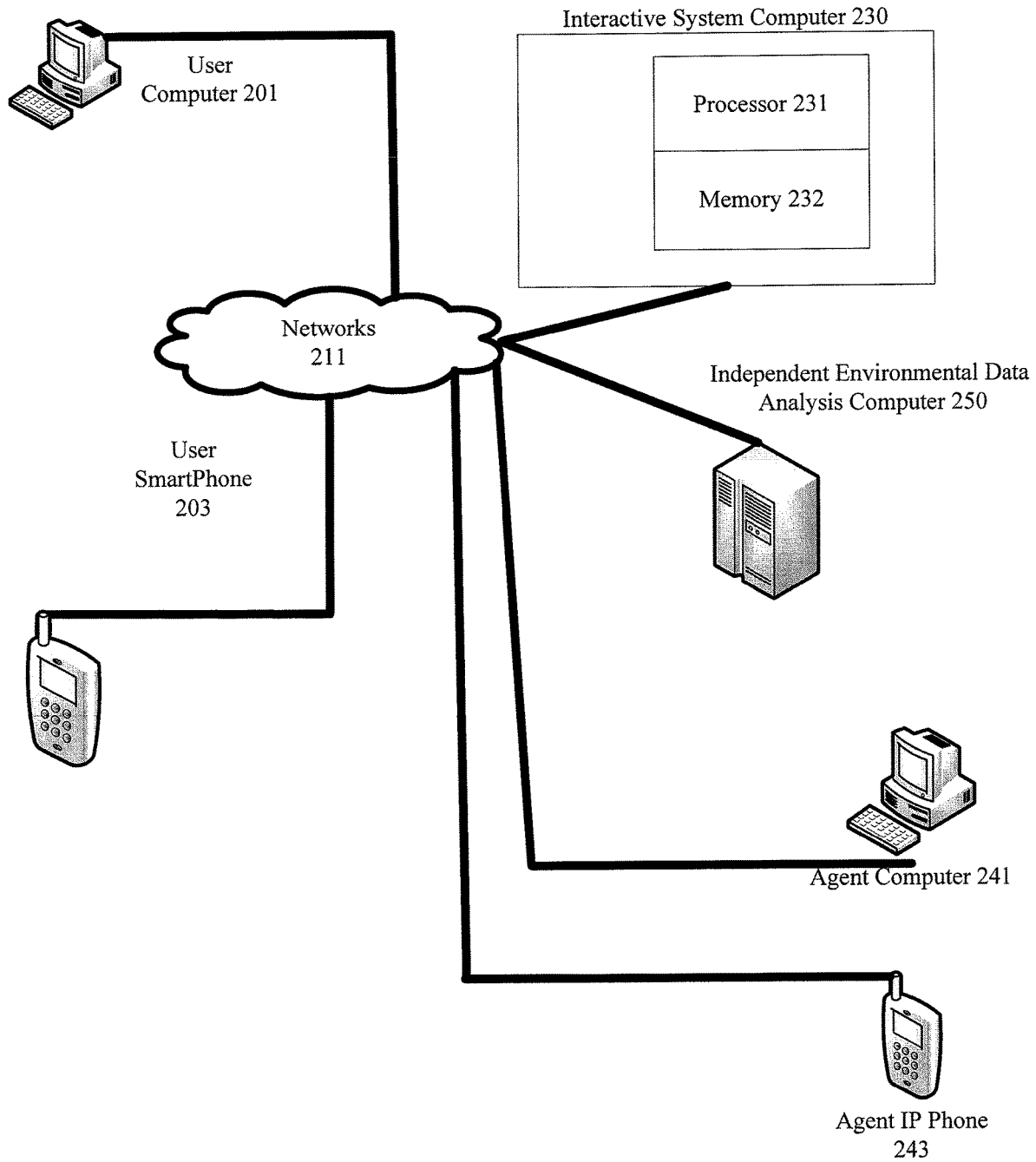
FIG. 2 shows an exemplary network for pre-processing for communication services, according to an aspect of the present disclosure.

FIG. 2 shows an exemplary network that includes an interactive system computer 230, an agent computer 241 and an agent IP phone 243 to provide a communication service using pre-processed environmental data from user computer 201 and user smartphone 203, according to an aspect of the present disclosure. An agent system may use analog phones as an alternative to an IP phone 243, or combined analog/IP devices that convert analog input to IP output and vice versa. In FIG. 2, user computers 201 and user smartphone 203 each communicate across networks 211 with interactive system computer 230. The interactive system computer 230 is a computer such as the general computer system 100 shown in FIG. 1, and includes processor 231 and memory 232 consistent with the descriptions of processors and memory described for FIG. 1. The interactive system computer 230 may be an interactive voice response system computer for voice calls or a web server or other type of server for interactive web sites. The networks 211 may be any combination of wired, wireless, voice, data, packet-switched and circuit-switched networks, so long as the networks 211 can carry communications from user computer 201 and user smart phone 203 to the interactive system computer 203.

Additionally, networks 211 and other networks described herein may include different networks used differently to carry voice and data. For example, a code division multiple access (CDMA) network may not permit simultaneous use of a data connection and a voice connection due to compliance with a data-only standard rather than a data and voice standard, so a voice communication and a data communication involving a communication device may require the CDMA network as well as a separate second network to communicate using voice and data simultaneously or otherwise in cooperation. Similarly, separate CDMA and LTE networks may be used for voice and data communications using two separate antennas and two separate network connections on a single user device. Alternatively, a CDMA network may be used for voice communications and a WiFi network for data communications and Bluetooth connection for sensor data. As yet another alternative, an LTE network may be used for wide area network voice and data and a WiFi network for local area network sensor data communications for, e.g., sensors such as IP video cameras.

Whereas in FIG. 2 an interactive system computer 230 may be an automated computer agent that provides all or part of a communication service, an agent computer 241 and agent IP phone 243 may also be used by human agents to provide all or part of a communication service. Agents that provide a communication service may communicate using isolated voice or data networks and systems, or integrated voice and data networks and systems of any type known. For example, a call to an interactive response system that includes interactive voice response can be initiated by a user using a smartphone, and the interactive response system can send a text link to the user so that the user can then simultaneously visit a website of the interactive response system while interacting with the interactive voice response of the interactive response system.

In the embodiment of FIG. 2, the interactive system computer 230 may provide coordinated services with agents using agent computer 241 and agent IP phone 243. For example, the interactive system computer 230 may be an interactive voice response system that initially receives and processes calls before identifying and transferring the calls to an appropriate agent using the agent IP phone 243 and agent computer 241.

In the embodiment of FIG. 2, the environmental data is data from the environment at the location of user computer 201 or user smartphone 203. An application running on the user computer 201 or user smartphone 203 may detect that a communication is being initiated, such as a call to a 911 service, and begin gathering environmental data while the call is being placed and awaiting answer. For example, the application running on user computer 201 or user smartphone 203 may detect that a call is being placed to 911, and immediately begin recording and analyzing sounds around the device to try and determine the nature of the emergency for which the call is being placed. The application may include speech and voice recognition or other sound recognition to use in analyzing whether captured audio can help explain why the call is being placed, or the application may simply capture and forward audio for analysis by the agent systems or a proxy for the agent systems. The environmental data that is captured, retrieved and/or analyzed can be temperature, time of day, time zone, location, voice data, image or video data, and include data from other applications such as a weather monitoring application or a camera application. The environmental data is sent across networks 211 to the interactive system computer 230, and/or agent computer 241, and/or agent IP phone 243 or another type of computer that can analyze and use the environmental data to supplement a communication service being requested.

In another embodiment, the environmental data may be sent to and analyzed by a different computer than the computer used as or by the agent in FIG. 2 to provide the communication service. The different computer can analyze the environmental data and then feed analysis results to the computer and/or phone used as or by the agent in FIG. 2. An example of such a different computer is shown in FIG. 2 as independent environmental data analysis computer 250. In FIG. 2, independent environmental data analysis computer 250 serves as a proxy for agent systems so as to receive and analyze environmental data from user devices. In the embodiment of FIG. 2 this different computer 250 may receive and analyze environmental data and provide the analysis results to the automated agent at interactive system computer 230 or the human agent using agent computer 241 and/or agent IP phone 243. The independent environmental data analysis computer 250 may collect environmental data from the user computer 201 and user smartphone 203, and analyze the environmental data on behalf of the agent systems.

In the embodiment of FIG. 2, agent systems are shown by way of interactive system computer 230, agent computer 241, and agent IP phone 243. As noted, human and virtual/automated agents in FIG. 2 may receive environmental data from the independent environmental data analysis computer 250. However, agent systems can be isolated or integrated voice and data systems of any type known for use by agents that provide communication services. The agents and agent systems can receive environmental data already processed by the user devices from which the environmental data is sent, or may receive raw environmental data for processing and interpretation of relevance in order to supplement the requested communication service.

Figure 3:
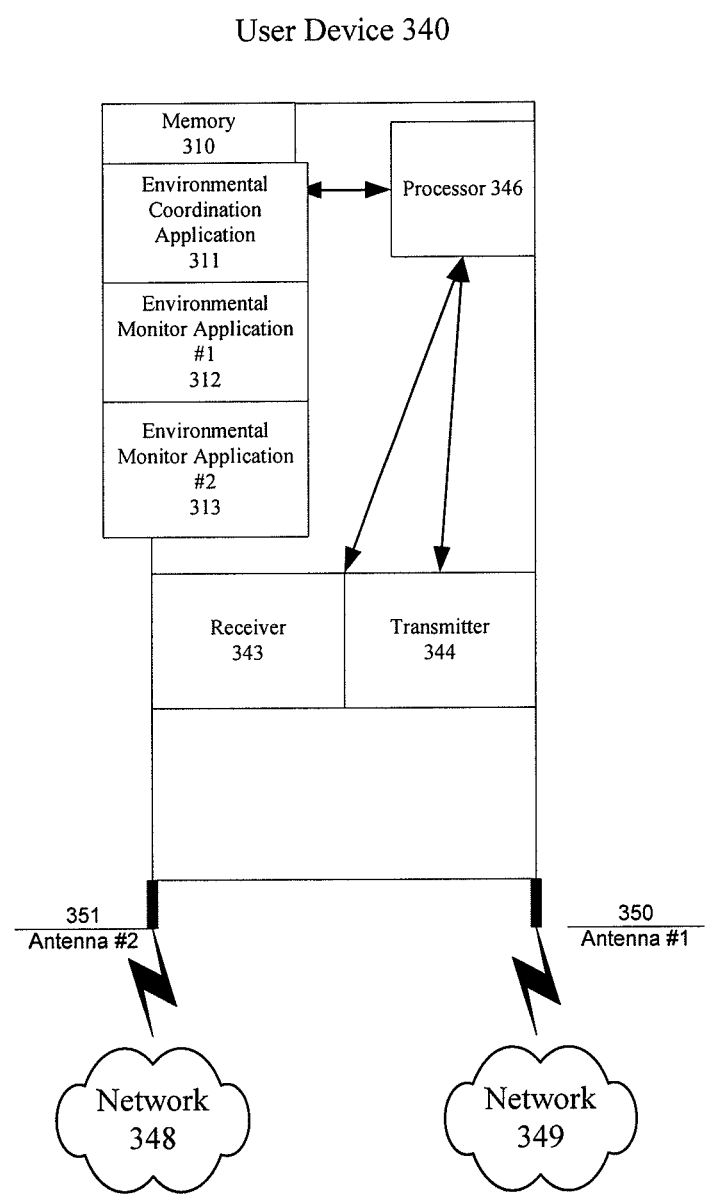
FIG. 3 shows an exemplary user device for pre-processing for communication services, according to an aspect of the present disclosure.

FIG. 3 shows an exemplary user device for pre-processing for communication services, according to an aspect of the present disclosure. In FIG. 3, user device 340 includes a memory 310 that stores instructions and data, and a processor 346 that processes the instructions and uses the data in accordance with the instructions. The user device 340 also includes environmental coordination application 311 that coordinates activities of environmental monitor application #1 312 and environmental monitor application #2 313. The user device 340 also includes a receiver 343 and a transmitter 344 for communicating over network 348 and network 349. As shown in FIG. 3, the user device 340 includes two different antennas 350 and 351. The two different antennas 350 and 351 are representative of circumstances where a communication takes place over a first network and environmental data is sent over a different and possibly incompatible second network.

Environmental monitor application #1 312 and environmental monitor application #2 313 may be applications that monitor different aspects of the environment around a communications device, such as outdoor temperature and weather from a weather service and temperature immediately around the communication device from a built-in thermometer. The environmental coordination application 311 may analyze communications as they are being initiated, and determine when to provide the environmental data from environmental monitor application #1 312 and environmental monitor application #2 313 to a particular communication service.

In FIG. 3, user device 340 is used by a user to initiate communications. An example of user device 340 is a smart phone, a tablet, a laptop or other computer that communicates using Voice over Internet Protocol (VoIP). The user device 340 performs disparate tasks in the embodiment of FIG. 3, including initiating a communication to a communication service provider, detecting that the communication has been initiated, and identifying environmental data based on detecting that the communication has been initiated. The user device 340 can send identified environmental data to the communication service provider or a proxy for the communication service provider, and the communication service provider can then use the environmental data to supplement the communication service. Therefore, the supplementing of the communication service is provided both by the user device 340 sending the identified environmental data to the communication service provider or proxy, and the communication service provider actually using the identified environmental data to enhance, alter, revise, update or otherwise affect the communication service that is provided.

In FIG. 3, the receiver 343 and transmitter 344 communicate over network 348 and network 349 respectively. The processor 346 processes instructions and data from the receiver 343 and memory 310, and forwards instructions or data to transmitter 344 for transmission or to memory 310 for storage. In FIG. 3, environmental coordination application 311 may monitor an input device of the user device 340, such as an alpha-numeric input device 160 shown in FIG. 1. When environmental coordination application 311 detects that a communication is being initiated, the environmental coordination application may identify the input address of the communication recipient, and determine whether the identified communication recipient corresponds to a communication service provider for which environmental data should be sent to supplement the communication service.

The recipients of the communications sent by the user device 340 include automated and human agents of a communication service provider, such as interactive system computer 230 in FIG. 2, or agent computer 241 and agent IP phone 243 in FIG. 2. The recipients may receive the environmental data directly from the user device 340, or from a proxy such as an internet application server. The communication service provider and/or proxy analyzes the environmental data and the environmental data is used to update a communication service script used by agents to provide the communication service.

In other embodiments, part of communication service scripts may be executed on the user devices as part of distributed processing, and the part of the communication service scripts on the user devices may be updated based on the environmental data without requiring that the environmental data be sent across the network to any agent system. For example assistance applications on user devices might be coordinated with service applications on internet servers, so that the assistance applications analyze the environmental data on the user devices and vary the parts of the communication service script executed on the user devices in accordance with the analysis results.

Figure 4:
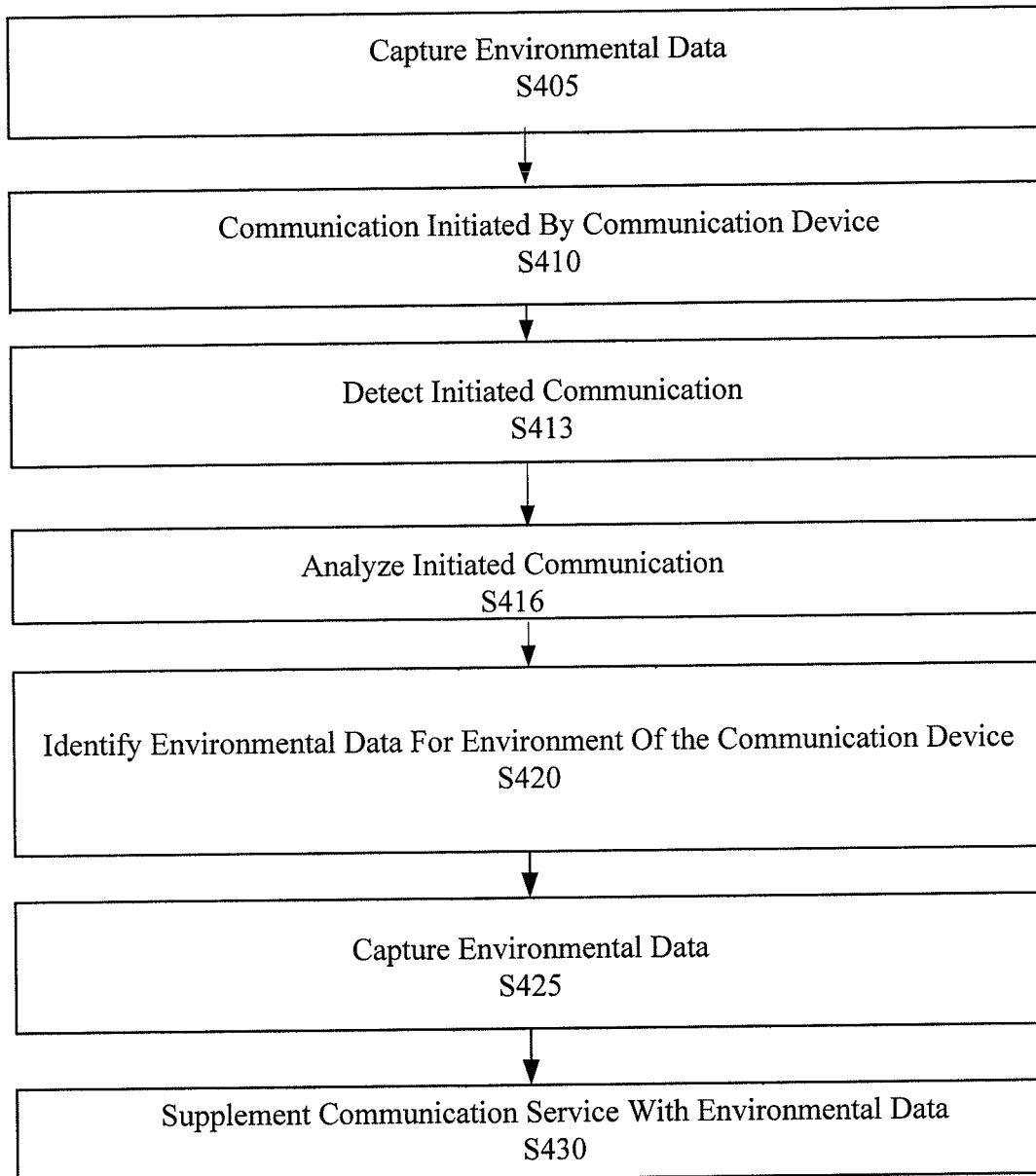
FIG. 4 shows an exemplary process for pre-processing for communication services, according to an aspect of the present disclosure.

FIG. 4 shows an exemplary process for pre-processing for communication services, according to an aspect of the present disclosure. In FIG. 4, environmental data is captured at S405 before a communication is initiated by a communications device at S410. At S413, the initiated communication is detected and at S416 the initiated communication is analyzed. As described in the embodiment of FIG. 3, an environmental coordination application 311 on a user device 340 may monitor the user device 340 for initiated communications. For example, the environmental coordination application 311 may monitor an alpha-numeric input device 160 shown in FIG. 1 for input addresses, or may monitor output of the processor 110 shown in FIG. 1 to detect when a communication is initiated at S413. Upon determining that the communication is initiated, the environmental coordination application 311 analyzes the initiated communication at S416 based on the available data to identify the destination and/or nature of the initiated communication.

Based on the results of the analysis at S416, the environmental coordination application 311 on user device 340 identifies environmental data, such as from monitor applications 312 and 313, for an environment of the communications device at S420. The environmental coordination application 311 may include instructions that certain environmental data, or categories of environmental data, are to be provided in supplementing communications to particular destinations or types of destinations.

As an example, at S416, the environmental coordination application 311 may identify that a call is being made to 911, and at S420 sorts through multiple types of available environmental data to identify which of the available environmental data might be relevant to the 911 communication service. At S420, the environmental coordination application 311 may determine that a 911 service may find location information, including whether the user device 340 is indoors or outdoors, most relevant to the 911 service. Alternatively or additionally, at S420 the environmental coordination application 311 may determine that the 911 service may wish to have audio or even video data captured while the call is being processed or awaiting answer by an agent. The environmental coordination application 311 may then turn on a microphone and/or camera on the user device 340, and begin capturing and recording the identified environmental data to provide to the 911 service as data.

At S425, environmental data is captured by the user device 340. The environmental data captured at S425 is in addition to any environmental data captured at or subsequent to S405, and is captured after the initiated communication is detected at S413. The environmental data captured at S425 may be identified and captured specifically in response to the identification of relevant environmental data that may be relevant to the initiated communication at S420. At S430, the communication service is supplemented with the environmental data after the environmental data is provided to the communication service directly or via an intermediate proxy.

In FIG. 4, communications may be addressed to a variety of different communications addresses for different communication services and types of communication services. For example, telephony communications may be addressed to 911 or other government service addresses, or help lines or complaint lines. Similarly, Internet addresses may be addressed to any number of different communication service providers including utility, insurance, banking, travel, government, medical services, and other kinds of service providers.

Although the environmental data described herein is not profile or history data from previous communications initiated by user device 340, such profile and history data can also be used to supplement a communication in conjunction with the environmental data. For example, history data showing a pattern of calls from an address of a particular user device 340 may assist in identifying the type of environmental data that can be useful when a new call is received at an emergency address from the user device 340. The environmental data that is then captured may include audio and/or video data, as well as data from secondary devices such as medical monitors that capture and/or previously captured data pertinent to the destination of the identified communication.

As an example, a communication may be initiated as a call to a telephone number, or as a video conference request or a chat request over the Internet. An interactive system computer 230 as in FIG. 2 may receive the call or request, as well as environmental data from the user computer 201 or user smartphone 203. The environmental data can then be used to help an automated or human agent identify why the communication has been initiated, or how to help respond to the initiated communication.

As another example, a utility company such as a wireless service provider may have an application installed on a user's wireless device, so that when calls to the utility company are made the calls can be identified and environmental data obtained and analyzed prior to any agent being assigned to the call. In this way, even before an interactive response computer 230 in FIG. 2 answers the call and begins providing recorded announcements, the user device 340 in FIG. 3 may have already captured and analyzed environmental data and provided the environmental data to the interactive response computer 230. For instance, the environmental data may be captured audio such as words describing the problem for which the call is being made.

An application on the user device 340 may include an adaptable/modifiable service-side script that is modified in response to collecting sensor data from that home, such as data indicating power outages. Using such an adaptable/ modifiable service-side script for an application on the user device 340, repeated incidents can be automatically reported and acknowledged, resulting in the user not needing to report new incidents when the application has already initiated the report. In other words, the service-side script can be trained to initiate automated communications based on previous incidents. Alternatively, the environmental data may be a location of the user device, obtained either from a GPS application or another application on the user device 340. Using the environmental data, the utility company may change a script by which the agent interacts with a caller. For example, rather than starting the interaction with prompts for 7 or 8 different default options for a caller to select, the prompts may be rearranged so that the most likely options relevant for the call are presented first. In this way, using the environmental data, the utility may offer an option #1 as "Press 1 for billing problems" if the application on the user device 340 identifies speech indicating that a caller is calling for a billing problem, whereas a default option #1 would otherwise be "Press 1 to report a service outage". Thus, the communication service script and statements for an interactive agent may be varied depending on the environmental data obtained from the user device 340 when the call is initiated. As described herein, portions of the communication service script may also be executed on the user device, and these portions of the communication service script can be adapted using the environmental data without requiring that the environmental data be sent to the agent systems of the customer service provider across a network. For example, algorithms for collecting, pre-processing and analyzing raw data, as well as for identifying particular raw data to send to the service provider, can be a part of an application on a user device, and can be modified by the nature of the data collected. Communication service scripts on the agent systems can also be adjusted as the data arrives before or even while the main communication occurs between the user and the agent.

Figure 5:
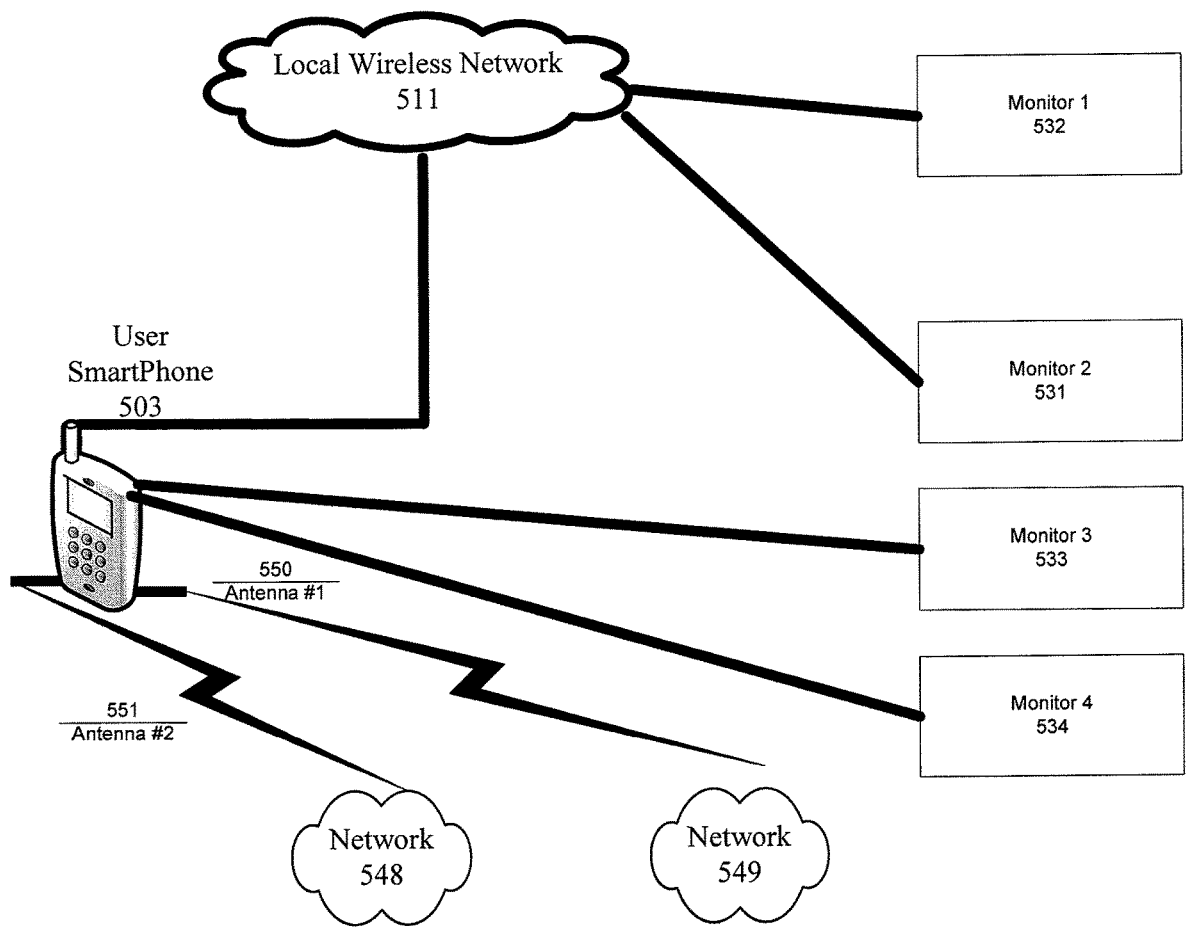
FIG. 5 shows another exemplary network for pre-processing for communication services, according to an aspect of the present disclosure.

FIG. 5 shows another exemplary network for pre-processing for communication services, according to an aspect of the present disclosure. In FIG. 5, a user smartphone 503 again has two antennas, antenna #1 550 and antenna #2 551. The antennas 550 and 551 are used to communicate across different networks 548 and 549, such as a voice network and a data network. In FIG. 5, the user smartphone 503 also communicates across a local wireless network 511, such as a wireless fidelity (WiFi) network, with monitor #1 532 and monitor #2 531. In FIG. 5, the user smartphone 503 also communicates directly via, e.g., bluetooth, with monitor 33 533 and monitor #4 534.

Monitors 531, 532, 533 and 534 in FIG. 5 may be monitors that monitor health characteristics for an individual, such as blood pressure, heart rate, body temperature, brain activity, or other health characteristics that can be detected by a monitor. Alternatively, monitors 531, 532, 533 and 534 may be alarm sensors such as fire alarms, smoke alarms, carbon monoxide alarms, or door and window intrusion alarms. Monitors 531, 532, 533 and 534 may also be video monitors or audio monitors. Monitors 531, 532, 533 and 534 may also be appliance monitors, such as monitors that monitor for water (moisture) under a refrigerator or sink, or a gas monitor that monitors for gas leaks around a stove or fireplace. Monitors 531, 532, 533 and 534 may also be monitors for indoor environmental conditions, such as monitors for pollen, particular allergens or humidity. Monitors 531, 532, 533 and 534 may also be monitors for outdoor environmental conditions such as temperature, humidity or pollen.

In FIG. 5, the environmental data may be collected by the monitors 531-534 even before a communication is initiated by user smartphone 503, and then identified by an application on the user smartphone 503 once a communication is initiated. The environmental data may also be collected by the monitors 531-535 as the communication is being initiated, during the communication with an agent, and even after the communication with the agent ends. Thus, environmental data may be initially collected based on the communication being initiated, or may be collected continuously or periodically including before the communication is initiated.

Figure 6:
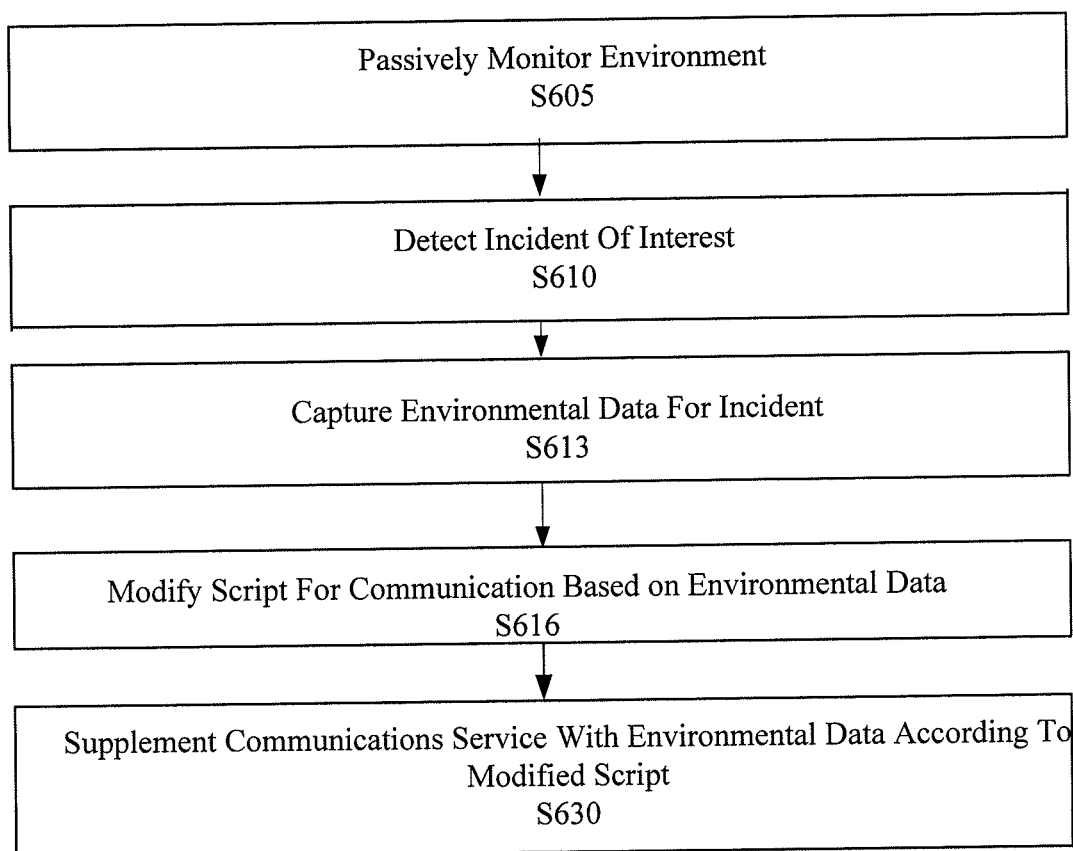
FIG. 6 shows another exemplary process for pre-processing for communication services, according to an aspect of the present disclosure.

FIG. 6 shows another exemplary process for pre-processing for communication services, according to an aspect of the present disclosure. In FIG. 6, an environment in proximity to a user device is monitored at S605, by the user device and/or by secondary monitor devices as explained for the network shown in FIG. 5. At S610, an incident of interest is detected. At S613, environmental data for the incident is captured. The environmental data captured at S613 may include whatever triggered the detection of the incident of interest at S610. At S616, a communication service script for a communication is modified based on the environmental data, and at S630, a communication service may be supplemented with environmental data according to the modified communication service script.

As a somewhat-extreme example consistent with the embodiment of FIG. 6, a gunshot detector in an outdoor environment may detect and record a gunshot, and then initiate an automated call to 911, either directly or through a monitoring system for the gunshot detector. The environmental data may include an approximated location of the gunshots, a number of the gunshots, a recording of the gunshots, a determination whether the gunshots were in a structure or a car or out on the street, an outdoor air temperature in the area around the gunshot detector, video or additional audio from around the gunshot detector, or even environmental data from other monitors in the vicinity of the gunshot detector. In this way, even as a call is being initiated to the 911 system, data that might be relevant to the 911 system for the call is collected and analyzed and provided to the 911 system. This environmental data may also be provided in association with individual humans that independently place calls to 911 to report the gunshots. In this way, smartphones and other devices may include applications that collect and provide environmental data to assist a communication service before, during and after the call is initiated and an agent is assigned to the communication for interaction. Moreover, an incident can be crowd sourced, so that a communications device may refrain from gathering data and/or automatically contacting 911 when other nearby communications devices do not corroborate the reports.

Additionally, particular agents may be assigned to a communication based on the environmental data captured and analyzed before any automated or human agent is assigned. For example, environmental data may reflect that a caller or humans around the caller are speaking in a language other than English, where English is the default language assumed for calls by the service provider. In this instance, an agent familiar with the language detected around the user device may be assigned to the call.

Figure 7:
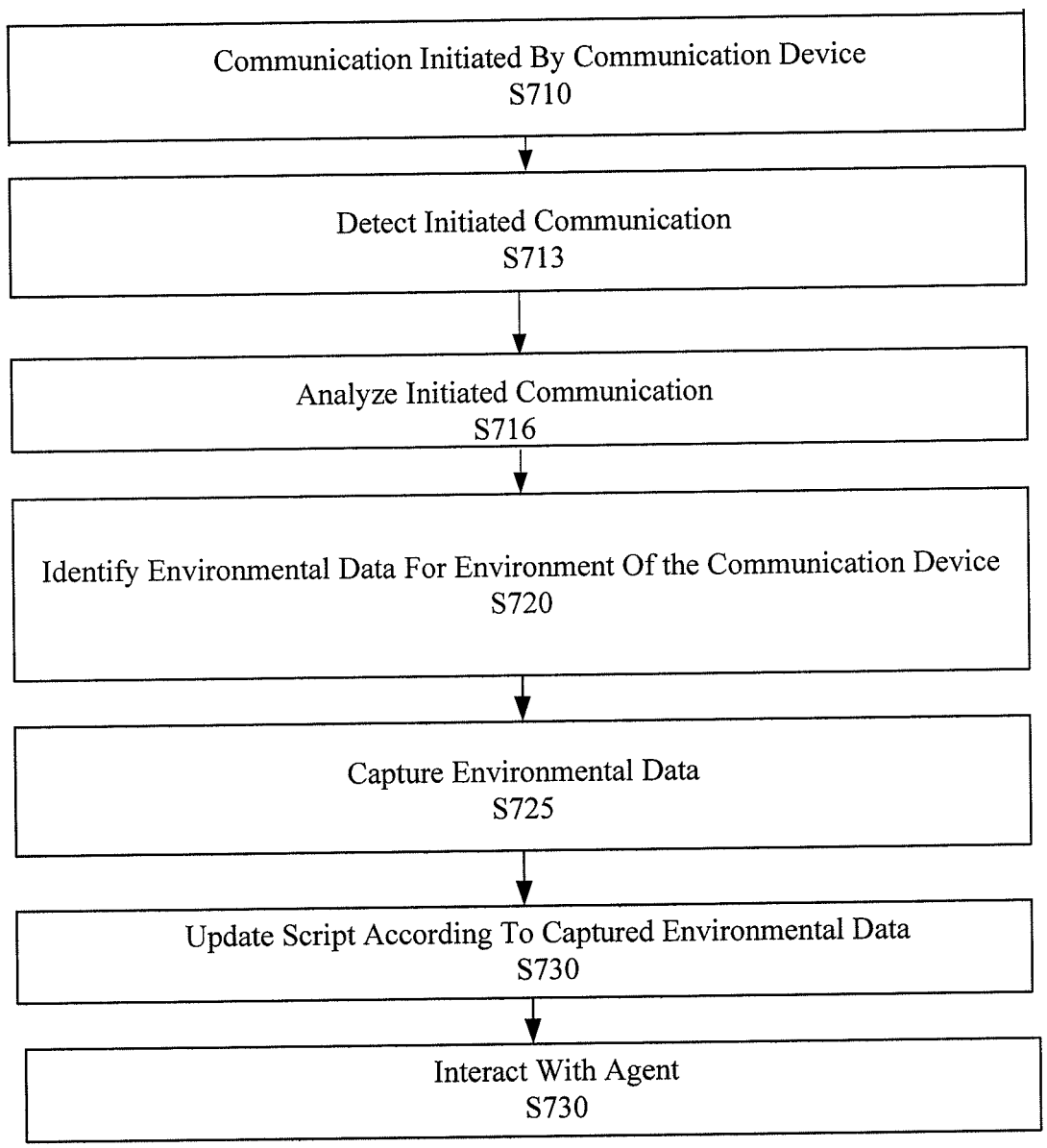
FIG. 7 shows another exemplary process for pre-processing for communication services, according to an aspect of the present disclosure.

FIG. 7 shows another exemplary process for pre-processing for communication services, according to an aspect of the present disclosure. In FIG. 7, a communication is initiated by a communications device at S710. The initiated communication is detected at S713. The initiated communication is analyzed at S716. Environmental data for an environment of the communications device is identified at S720. At S725, environmental data is captured. At S730, a default communication service script used to provide a communication service is updated according to the captured environmental data. At S730, a requester using the user device interacts with an agent.

In the embodiment of FIG. 7, environmental data is captured at S725 after the initiated communication is detected and analyzed and the environmental data is identified. For example, medical data may be continuously obtained and recorded by medical monitors, and when a call is made to a hospital, doctor or other medical provider to report the recorded medical data, the call may be recognized and the medical data may be automatically sent via a data connection. In this way, a doctor or medical provider receiving a call to discuss a patient's medical conditions may also automatically receive the patient's medical data that is identified, captured and provided across the network even before the call is answered by an agent. In the embodiment of FIG. 7, calls to a communication service such as an insurance provider may also be detected so as to identify environmental data to report to the insurance provider.

Figure 8:
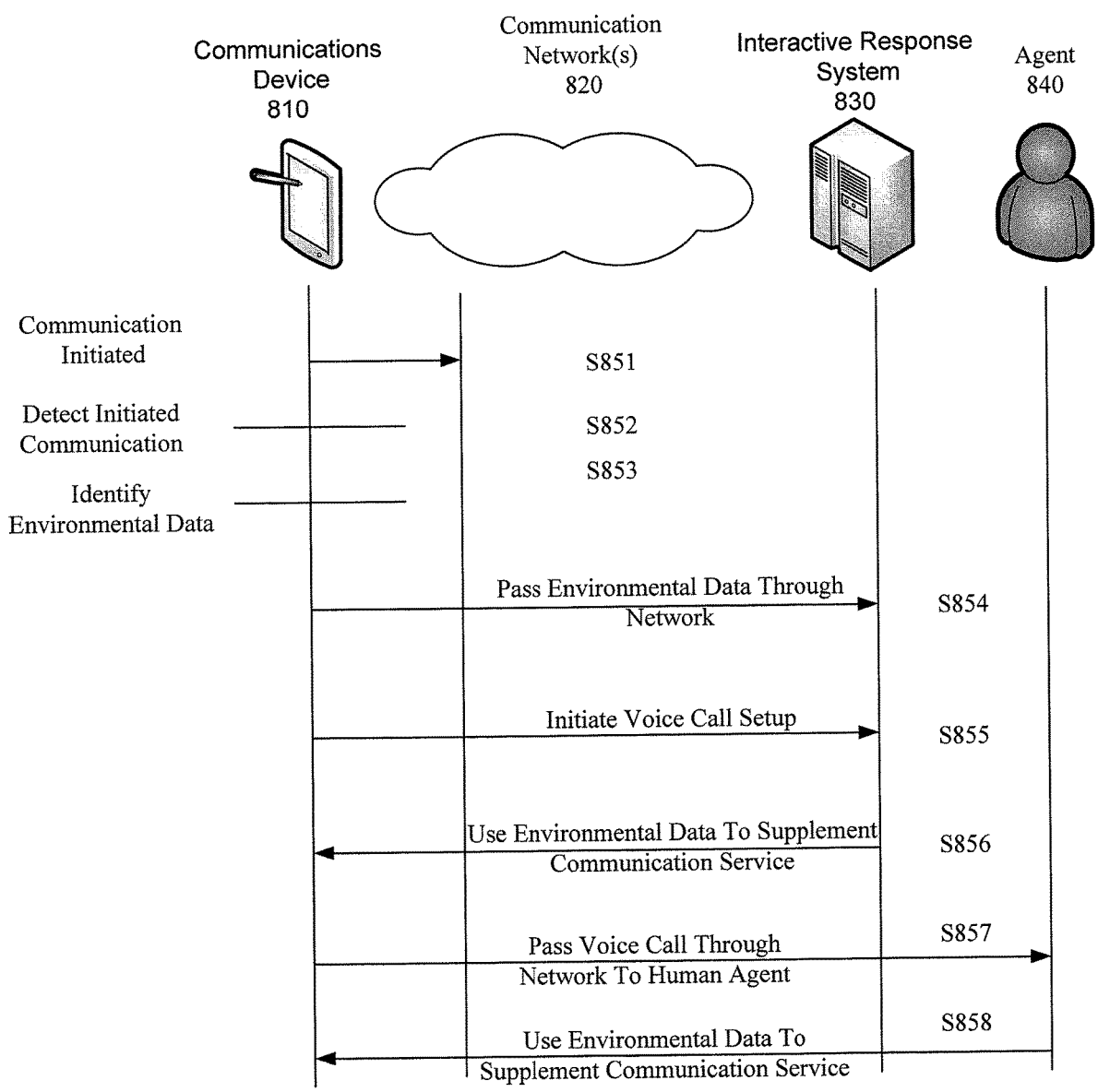
FIG. 8 shows a flow diagram for pre-processing for communication services, according to an aspect of the present disclosure.

FIG. 8 shows a flow diagram for pre-processing for communication services, according to an aspect of the present disclosure. As shown in FIG. 8, a communications device 810 communications with an interactive response system 830 across communications networks 820. The communication may also be passed from the interactive response system 830 to a human agent 840.

In FIG. 8, the communication is initiated at S851 by, for example, a user of the communications device entering a telephone number and pressing "send". As shown, at S852 the communications device 810 detects the initiated communication. An application running on the communications device 810 may, for example, detect input from the user to an alpha-numeric interface and recognize the input as a communications address. At S853, the communications device 810 identifies environmental data that may be useful to the communication service to which the communication is directed. At S854, the identified environmental data is passed form the communications device 810 to the interactive response system. At S855, the communications device initiates a voice call setup to setup the call to the interactive response system 830 through the communication network(s) 820. At S856, the environmental data is used by the interactive response system 830 to supplement the communication service provided by the interactive response system. That is, the communication service that would otherwise be provided by the interactive response system 830 is altered, modified, updated or otherwise changed to use the environmental data passed from the communications device 810.

At S857, the voice call is passed from the interactive response system 830 to the human agent 840. At S858, the human agent uses the environmental data to supplement the communication service provided by the human agent. That is, the communication service that would otherwise be provided by the human agent is altered, modified, updated or otherwise changed to use the environmental data passed from the communications device 810.

Figure 9:
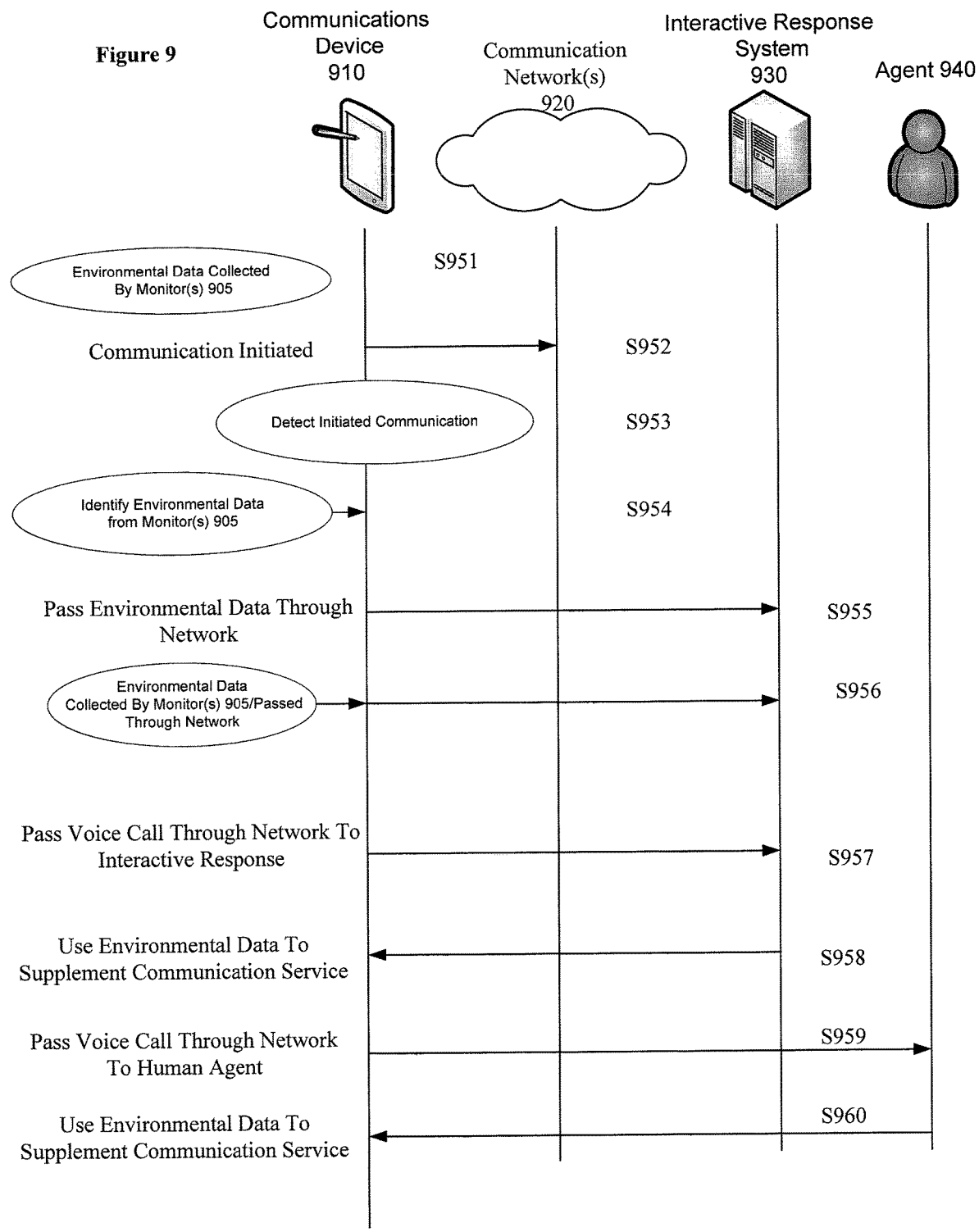
FIG. 9 shows another flow diagram for pre-processing for communication services, according to an aspect of the present disclosure.

FIG. 9 shows another flow diagram for pre-processing for communication services, according to an aspect of the present disclosure. In FIG. 9, monitor(s) 905 are also present in the environment of a communications device, now labeled as 910. As shown in FIG. 9, monitor(s) 905 collect environmental data at S951 even before a communication is initiated by communications device 910 with an interactive response system 930 across communication(s) networks 920. The communication in this embodiment may also be passed from the interactive response system 930 to a human agent 940.

In FIG. 9, the communication is initiated at S952 by, for example, a user of the communications device entering a telephone number and pressing "send". As shown, at S953 the communications device 910 detects the initiated communication. An application running on communications device 910 may, for example, detect input from the user to an alpha-numeric interface and recognize the input as a communications address. At S954, the communications device 910 identifies environmental data that may be useful to the communication service to which the communication is directed. At S955, the identified environmental data is passed form the communications device 910 to the interactive response system 930 through the communication network(s) 920. At S956, the environmental data is again collected and passed through the network to the interactive response system 930. At S958 the environmental data is used to supplement the communication service provided by the interactive response system 930.

At S959, the voice call is passed from the interactive response system 930 to the human agent 940. At S960, the human agent uses the environmental data to supplement the communication service provided by the human agent.

As an implementation example for FIG. 9, environmental data can be continuously gathered by monitor(s) 905 before a call and stored on a local memory for the monitor(s) 905. Such environmental data can be, for example, medical measurements over time. This pre-collected data can also be analyzed and parsed so as to leverage user resources rather than network resources when such environmental data is to be sent to a communication service provider. Later, a call is placed, and the user communications device 910 detects the initiated communication at S953, and identifies the destination of the call and the environmental data that is to be sent to the communication service provider with the call. Similarly, at S956 environmental data might be real-time speech heard while awaiting an agent, such as "My head hurts" or "My bill is wrong". Any of this environmental data can be used by a service provider to vary the interactive response offerings offered to a user initiating the communication. In an embodiment of FIG. 10 described later, an application on a user device may passively monitor the environment around the communication device, and gather environmental data when key triggers are detected, such as urgency in a voice.

In the embodiment of FIG. 9, environmental data is collected before the communication is even initiated by communications device 910. Further, environmental data is collected after environmental data is identified at S954 to determine which environmental data may be of use to the communication service to which the initiated communication is directed. Thus, environmental data may be passed through multiple times, and collected even after a communication is initiated or on a periodic or ongoing basis when appropriate.

FIG. 10 shows another flow diagram for pre-processing for communication services, according to an aspect of the present disclosure. In FIG. 10, communications device 1010 communications with interactive response system 1030 across communication network(s) 1020. Communications may be passed from interactive response system 1030 to human agent 1040.

At S1051, environmental data is collected based on a trigger. The environmental data in FIG. 10 is collected before a communication is even initiated, such as when a monitoring application on the communications device 1010 detects an event while passively monitoring the environment of the communications device. At S1052, communications device 1010 initiates a communication through the communication(s) network 1020. At S1053, the initiated communication is detected by an application running on the communications device 1010. At S1054, environmental data is identified by the communications device, based on the initiated communication being detected.

At S1055, environmental data is passed through the network(s) 1020 from communications device 1010 to interactive response system 1030. At S1056, a voice call is passed through the network to the interactive response system. At S1057, the interactive response system uses the environmental data to supplement the communication service provided by the interactive response system 1030. At S1058, the voice call is passed through the network(s) 1020 to the human agent 1040, and at S1059 the environmental data is used to supplement the communication service provided by the human agent 1040.

In the embodiments described herein, rules used to collect environmental data can be adjusted after a communication, so that the communication device and/or monitors adjust which environmental data is collected, analyzed and sent for particular communication service providers. For example, after a call, an application on a user communication device, or network-originated commands, can be applied to adjust data collection rules on the user communications devices and/or monitors described herein. For example, a pattern of medical calls could lead an application on a user device, or a program on an agent system, to order the user communication device to begin continuous data collection of biometric data.

As described herein, communication services can be supplemented with environmental data from an immediate environment around a user device that initiates the communication, and the environmental data may have been collected even before the communication is initiated. An example of the pre-processing described herein involves a financial institution with a downloadable application installed on customers' communications devices. When a customer begins to call the financial institution, the financial institution's application on the customer's communications device may gather information from other predetermined relevant applications on the communications device, such as other financial applications that periodically monitor multiple financial accounts for a user. In this way, the financial institution's application may determine that the user has recently incurred fees from other financial institutions, and may be inquiring how to avoid such fees by transferring an account to the financial institution. Alternatively, the financial institution may determine that the user is in a location that recently experienced a natural disaster, and is likely to be calling for assistance related to the natural disaster such as insurance information or a location of a functioning Automatic Teller Machine.

As described in the present disclosure, communication services can leverage down time from when communications are being initiated to when an agent is assigned by obtaining environmental data from the environment around a user device used to initiate the communication. The communication services can identify speech, location, weather characteristics or any other environmental characteristics that can be used to assist an agent in providing a communication service. The context information described herein can be pre-processed, or processed in parallel with a communication, so as to reduce time required to determine the reason for a call and an appropriate solution for the caller. The context information can also be used to help identify an appropriate agent to handle a call, such as when the context information identifies that a caller or other parties in the area of a user device have great stress in their voices. Accordingly, environmental data can be variably identified and analyzed depending on the communication address to which a communication is being directed, and in some circumstances even before a user presses "send" on their communication device. Several of the embodiments described herein involve the identification and use of environmental data while a communication is being initiated and up to the time the agent joins the call as this pre-processing can help the agent join the communication and avoid unnecessary requests.

The range of environmental data as described herein is open-ended, and can include temperature, location, speech, medical monitor data, time/date, camera visuals, or other data. Additionally, environmental data can be gathered at any point in or even before a communication: before any sort of trigger, at the first trigger and up to the initiation of communications, between the initiation of communications and the human/automated agent answering the communications, and even after the communication is answered. Similarly, the processing at any point at which environmental data is obtained and/or analyzed can be repeated again at another point i, as the context of a communication becomes more clear and a type or types of relevant environmental data to obtain comes in focus. Therefore, data collection rules for collecting environmental data can be adjusted, and selection of types of data to gather and analyze and send can be repeated at each phase.

Additionally, though the present disclosure explains that different networks and antennas may be provided for voice and data communications, a voice and data channel may be provided together and used for the simultaneous or alternate communication of voice and data. For example, a single logical IP data channel may be used to carry voice and any number of data subchannels.

Additionally, an entire network of communications devices and accessories or secondary devices/monitors may be provided, such as when a communications device is connected by Bluetooth to a collection of household environmental monitors, all of which provide environmental data. In a similar manner, multiple communications devices may be used together to communicate with a communication service, such as when a caller uses a telephone to call a customer service line and then communicates over a website on a personal computer of the communication service provider while on the telephone. In such a circumstance, multiple devices could be employed. Similarly, as described herein, an agent system may have multiple communications devices that are employed together to provide a communication service. Moreover, environmental data could be sent simultaneously and redundantly over multiple networks, such as WiFi and cellular when a question arises as to whether data will be lost, or even when it is simply necessary or advantageous to allow separate upstream systems analyze data and then combine the analyzed data downstream Moreover, a group of users might all decide to initiate similar communications to a communication service, such as in a geographically dispersed team-oriented competition or for business purposes. Thus, networks and agent systems as described herein may be coordinated so as to communicate with multiple user communications devices so as to provide a single communication service, even when the multiple communications devices communicate over dissimilar or even incompatible networks.

Algorithms for collecting raw data, pre-processing or analyzing it, and sending selected parts of it can exist in any data collection element or in the user's communication device(s) and be modified by the nature of the data being collected, and further modified once the initial triggers or communications to certain destinations are initiated by way of the added context provided by those events. Communication service scripts in the network-resident agents can also adjust as the data comes in prior to the main communications occurring between the user and the agent.

As set forth herein, according to an aspect of the present disclosure, a method for providing a communication service includes detecting an initiated communication initiated by a communications device with a processor and a memory. Environmental data for an environment of the communications device is identified based on detecting the initiated communication. The environmental data is used to supplement a communication service requested by the initiated communication.

According to another aspect of the present disclosure, the initiated communication is a telephone call over a first channel, and the environmental data is sent over a second channel.

According to yet another aspect of the present disclosure, the second channel is a data channel.

According to still another aspect of the present disclosure, the communications device is used for both the telephone call and for sending the environmental data.

According to another aspect of the present disclosure, the environmental data is identified during a call setup of the telephone call.

According to another aspect of the present disclosure, the initiated communication is to an agent system that provides a service.

According to yet another aspect of the present disclosure, the environmental data is obtained before the initiated communication is initiated.

According to still aspect of the present disclosure, the environmental data is obtained based on a trigger.

According to another aspect of the present disclosure, the environmental data that is obtained is captured based on the trigger before the communication is initiated.

According to yet another aspect of the present disclosure, the environmental data is obtained after the initiated communication is initiated and before a human agent joins the communication to provide the communication service.

According to still another aspect of the present disclosure, the method also includes identifying additional environmental data for the environment of the communications device during the communication, and using the additional environmental data to update the environmental data used to supplement the communication service.

According to another aspect of the present disclosure, the environmental data includes an air temperature of air in an indoor environment of the communications device, and an air temperature of air in an outdoor environment outside of the indoor environment of the communications device.

According to yet another aspect of the present disclosure, the environmental data includes audio data captured in the environment of the communications device.

According to still another aspect of the present disclosure, the environmental data is obtained by the communications device from a secondary device in the environment of the communications device.

According to another aspect of the present disclosure, the secondary device is a medical monitor.

According to yet another aspect of the present disclosure, the communications device retrieves the environmental data from the medical monitor based on the initiated communication.

According to still another aspect of the present disclosure, the communication service is provided by a human agent using the environmental data.

According to another aspect of the present disclosure, the communication service is provided by an automated agent using the environmental data.

According to yet another aspect of the present disclosure, a communication service script used by an agent to provide the communication service is modified based on the environmental data.

According to still another aspect of the present disclosure, the environmental data is data of a location of the initiating party.

According to another aspect of the present disclosure, a communication service script used to provide the communication service is updated based on information known for the location.

According to yet another aspect of the present disclosure, the environmental data includes a location of the communications device, and a communication service script used to provide the communication service is updated based on information known for the location of the communications device.

According to still another aspect of the present disclosure, the environmental data is detected by the communications device using a first application running on the communications device, and the environmental data is obtained originally by a second application running on the communications device.

According to another aspect of the present disclosure, the environmental data comprises a time of day detected based upon a location of the communications device.

According to another aspect of the present disclosure, the environmental data comprises a determination whether the communications device is indoors based on a difference between the air temperature of air in the environment of the communications device and a known temperature of outdoor air in an area that includes the communications device.

According to another aspect of the present disclosure, the environmental data comprises voice information captured by the communications device before the agent system joins the communication.

According to another aspect of the present disclosure, the environmental data captures visual data captured by a camera of the communications device.

According to another aspect of the present disclosure, a type of the environmental data identified is selected in accordance with an input address input to the communications device to initiate the communication.

According to another aspect of the present disclosure, a persistent adjustment is made to the agent system based on the environmental data used to supplement the communication.

According to an aspect of the present disclosure, a system provides a communication service. The system includes a memory that stores executable instructions, and a processor that executes the executable instructions. When executed by the processor, the executable instructions cause the system to perform operations including detecting an initiated communication initiated by a communications device, and identifying environmental data for an environment of the communications device, based on detecting the initiated communication. The environmental data is used to supplement a communication service requested by the initiated communication.

According to an aspect of the present disclosure, a computer readable storage medium stores executable instructions that, when executed by a processor of a computer system, causes the system to perform operations. The operations include detecting an initiated communication initiated by a communications device with a processor and a memory, and identifying environmental data for an environment of the communications device, based on detecting the initiated communication. The environmental data is used to supplement a communication service requested by the initiated communication.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a communication service, the method comprising:
    receiving, by a communications device with a processor and a memory, an address for establishing a communication session over a wireless network, the address being input to the communications device;
    determining whether the address corresponds to a communication recipient for which health characteristic data of an individual is to be sent to supplement the communication service;
    placing a request for the communication session based on the address and awaiting answer of the request;
    monitoring the health characteristic data by the communications device while the request is being placed and the answer is awaited after determining that the address corresponds to the communication recipient for which the health characteristic data is to be sent to supplement the communication service, the health characteristic data being data from an environment at a location of the communications device;
    establishing the communication session with the communication recipient over the wireless network based on the address after monitoring the health characteristic data;
    sending the health characteristic data over the wireless network after establishing the communication session and determining that the address corresponds to the communication recipient for which the health characteristic data is to be sent to supplement the communication service;

identifying additional health characteristic data for the individual by the communications device after establishing the communication session; and using the additional health characteristic data to update the health characteristic data used to supplement the communication service.

2. The method according to claim 1,
wherein the communication session is established via a telephone call over a first channel, and
wherein the health characteristic data is sent over a second channel.

3. The method according to claim 2,
wherein the health characteristic data is identified during a call setup of the telephone call.

4. The method according to claim 2,
wherein the second channel is a data channel.

5. The method according to claim 2,
wherein the communications device is used for both the telephone call and for sending the health characteristic data.

6. The method according to claim 1,
wherein the communication session is initiated to an agent system that provides the communication service.

7. The method according to claim 1,
wherein the health characteristic data is further obtained before the communication session is initiated.

8. The method according to claim 7,
wherein the health characteristic data is obtained before the communication session is initiated based on a trigger.

9. The method according to claim 1,
wherein the additional health characteristic data and the health characteristic data are collected continuously.

10. The method according to claim 1,
wherein the health characteristic data includes at least one of body temperature blood pressure, heart rate, and brain activity.

11. The method according to claim 1,
wherein the health characteristic data is obtained by the communications device from a secondary device in the environment of the communications device.

12. The method according to claim 1,
wherein a communication service script used to provide the communication service is modified based on the health characteristic data.

13. The method according to claim 1,
wherein the health characteristic data includes the location of the communications device, and
wherein a communication service script used to provide the communication service is updated based on information known for the location of the communications device.

14. The method according to claim 1,
wherein the health characteristic data is detected by the communications device using a first application running on the communications device, and the health characteristic data is obtained originally by a second application running on the communications device.

15. The method according to claim 1,
wherein a type of the health characteristic data is selected in accordance with the address input to the communications device for establishing the communication session.

16. A system for providing a communication service, the system comprising:
a memory that stores a plurality of executable instructions;
a processor that executes the plurality of executable instructions;
wherein, when executed by the processor, the plurality of executable instructions cause the system to perform operations comprising:
receiving an address for establishing a communication session over a wireless network, the address being input to a communications device;
determining whether the address corresponds to a communication recipient for which health characteristic data of an individual is to be sent to supplement the communication session;
placing a request for the communication session based on the address and awaiting answer of the request;
monitoring the health characteristic data by the communications device while the request is being placed and the answer is awaited after determining that the address corresponds to the communication recipient for which the health characteristic data is to be sent to supplement the communication service, the health characteristic data being data from an environment at a location of the communications device;
establishing the communication session with the communication recipient over the wireless network based on the address after monitoring the health characteristic data;
sending the health characteristic data over the wireless network after establishing the communication session and determining that the address corresponds to the communication recipient for which the health characteristic data is to be sent to supplement the communication service;
identifying additional health characteristic data for the individual by the communications device after establishing the communication session; and
using the additional health characteristic data to update the health characteristic data used to supplement the communication service.

17. A non-transitory computer readable storage medium that stores a plurality of executable instructions that, when executed by a processor of a computer system, cause the computer system to perform operations comprising:
receiving an address for establishing a communication session over a wireless network, the address being input to a communications device;
determining whether the address corresponds to a communication recipient for which health characteristic data of an individual is to be sent to supplement the communication session;
placing a request for the communication session based on the address and awaiting answer of the request;
monitoring the health characteristic data by the communications device while the request is being placed and the answer is awaited after determining that the address corresponds to the communication recipient for which the health characteristic data is to be sent to supplement the communication service, the health characteristic data being data from an environment at a location of the communications device;
establishing the communication session with the communication recipient over the wireless network based on the address after monitoring the health characteristic data;

sending the health characteristic data over the wireless network after establishing the communication session and determining that the address corresponds to the communication recipient for which the health characteristic data is to be sent to supplement a communication service;

identifying additional health characteristic data for the individual by the communications device after establishing the communication session; and using the additional health characteristic data to update the health characteristic data used to supplement the communication service.

18. The method according to claim 1, further comprising:

turning on a device of the communications device for identifying the health characteristic data after determining that the address corresponds to the communication recipient for which the health characteristic data is to be sent to supplement the communication service.

19. The method according to claim 1, wherein the communication session is initiated by the communications device receiving the address from a user, and the address is a communication address of the communication recipient at which the communication session with the communication recipient is established over the wireless network.

20. The method according to claim 19, wherein the additional health characteristic data is identified and used during the communication session.

\* \* \* \* \*

UNITED STATES PATENT AND TRADEMARK OFFICE
CERTIFICATE OF CORRECTION

PATENT NO. : 10,623,568 B2
APPLICATION NO. : 13/706962
DATED : April 14, 2020
INVENTOR(S) : Chien Page 1 of 1

It is certified that error appears in the above-identified patent and that said Letters Patent is hereby corrected as shown below:

In the Claims

At Column 19, Line 40 (Claim 10), please change "temperature blood" to --temperature, blood--.

Signed and Sealed this
Twentieth Day of October, 2020

Andrei Iancu
*Director of the United States Patent and Trademark Office*